(12) United States Patent
Yoshikawa et al.

(10) Patent No.: US 7,699,536 B2
(45) Date of Patent: Apr. 20, 2010

(54) PLUGGABLE OPTICAL TRANSCEIVER

(75) Inventors: Satoshi Yoshikawa, Yokohama (JP);
Hirokazu Sasaki, Yokohama (JP)

(73) Assignee: Sumitomo Electric Industries Ltd., Osaka (JP)

( * ) Notice: Subject to any disclaimer, the term of this patent is extended or adjusted under 35 U.S.C. 154(b) by 577 days.

(21) Appl. No.: 11/730,736

(22) Filed: Apr. 3, 2007

(65) Prior Publication Data

US 2008/0247762 A1 Oct. 9, 2008

(51) Int. Cl.
*G02B 6/36* (2006.01)
*H04B 10/00* (2006.01)

(52) U.S. Cl. ............... 385/92; 385/88; 385/76; 385/139; 398/138; 398/139

(58) Field of Classification Search ......... 385/53, 385/76, 77, 88, 89, 92, 94, 139; 398/135, 398/138, 139
See application file for complete search history.

(56) References Cited

U.S. PATENT DOCUMENTS

| | | | | |
|---|---|---|---|---|
| 6,796,715 | B2 * | 9/2004 | Chiu et al. | 385/53 |
| 6,883,971 | B2 * | 4/2005 | Chiu et al. | 385/53 |
| 7,186,134 | B2 | 3/2007 | Togami et al. | 439/484 |
| 7,264,406 | B1 * | 9/2007 | Yoshikawa | 385/88 |
| 7,364,446 | B2 * | 4/2008 | Kurashima | 439/157 |
| 2003/0142917 | A1 | 7/2003 | Merrick | 385/53 |
| 2008/0247762 | A1 * | 10/2008 | Yoshikawa et al. | 398/138 |

* cited by examiner

*Primary Examiner*—Brian M Healy
(74) *Attorney, Agent, or Firm*—Smith, Gambrell & Russell, LLP

(57) ABSTRACT

The present invention provides a new releasing mechanism form a cage on the host system for a pluggable optical transceiver. The transceiver includes an optical receptacle, an actuator with a hook that latches with the key hole of the cage, a bail attached so as to rotate in front of the receptacle and a release button. Rotating the bail or pushing the button will bring the seesaw motion of the actuator that disengages the hook with the keyhole and the transceiver is enabled to be extracted from the cage by picking the bail positioned in front of the receptacle.

10 Claims, 7 Drawing Sheets

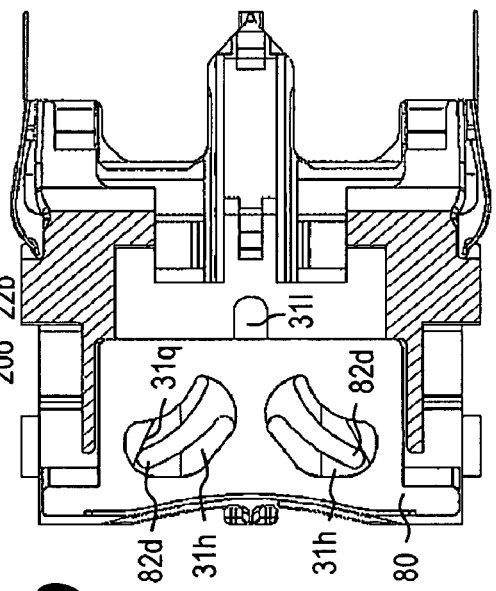
FIG. 6A
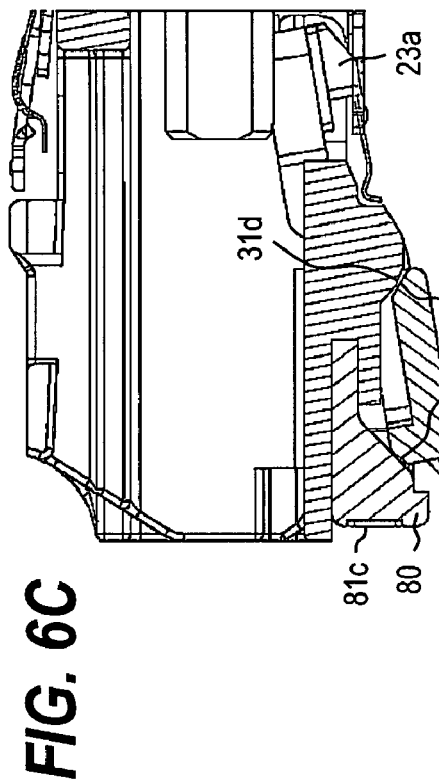
FIG. 6C
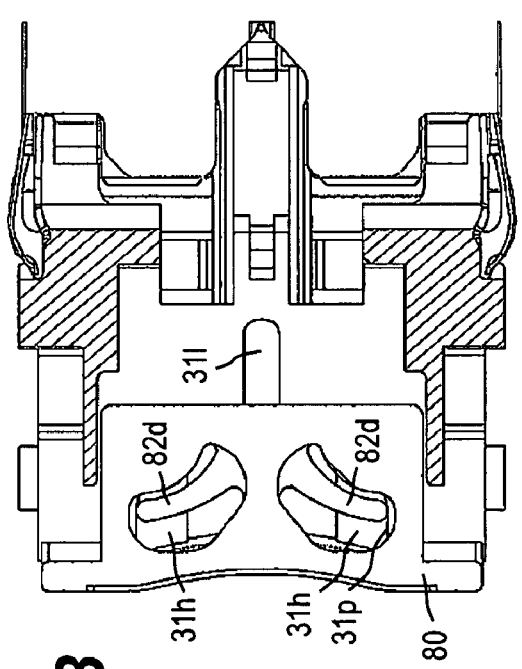
FIG. 6B
FIG. 6D

PLUGGABLE OPTICAL TRANSCEIVER

This application closely relates to pending applications Ser. No. 11/117,695, filed Apr. 29, 2005, entitled "Releasing mechanism of pluggable transceiver", and Ser. No. 11/372,230, filed Mar. 8, 2006, entitled "RELEASING MECHANISM OF PLUGGABLE TRANSCEIVER FROM CAGE", both of which are assigned to the same assignee of the present application, the entire contents of which are incorporated herein by references.

BACKGROUND OF THE INVENTION

1. Field of the Invention

The present invention relates to a mechanism of an optical pluggable transceiver for latching with/releasing from a cage.

2. Related Prior Art

The so-called pluggable transceiver is inserted into the cage of the host system. The cage is a metal box with one end thereof opening for the outside. This cage is installed on the host system such that an electrical connector on the host system is set in the deep end of the cage, and the opened end is exposed in the face panel of the host system. Thus, the pluggable transceiver is inserted into the cage from the face panel and an electrical plug provided in the rear end of the transceiver is mated with the electrical connector in the deep end of the cage.

In particular, the transceiver capable of inserting into or extracting from the cage without shutting down the host system is called as a hot pluggable transceiver. The pluggable transceiver is necessary to provide a mechanism for latching with the cage. It is necessary for the mechanism that, when the optical connector mates with the receptacle of the transceiver, the transceiver can not be released from the cage, and can be released only when the receptacle is free from the connector. Various latching mechanisms have been proposed and disclosed in prior arts.

The U.S. Pat. No. 7,186,134, has disclosed a latching mechanism, in which a combination of a bail with a shape of a wire frame and a pivot block causes a rock pin provided in the end of the block up-and-down motion to disengage the pin with the cage. The bail comprises a grip portion to be handled, a shoulder portion buried in the block, and a body portion connecting the grip portion to the shoulder portion, these portions configuring the wire frame.

A center of the shoulder portion forms a cam by bending the wire inward, and the shoulder portion including the cam is buried within the block. The block makes the seesaw motion around the pivot arm. That is, to rotate the bail causes the cam to be rotated within the groove to push the receptacle outward by the head of the cam. Thus, the block makes the seesaw motion, so the rock pin provided in the position opposite to the cam portion is pulled within the receptacle to release the engagement between the pin and the cage. This transceiver provides a fin for supporting the block from the bottom, accordingly, the block may not dismantled from the receptacle.

The United States patent application, published as US A-2003-142917, has disclosed another latching mechanism. This mechanism, although providing the bail and the actuator, the bail only functions as a grip to slide the actuator frontward and rearward. The rotation of the bail is not converted into the longitudinal motion of the actuator or the vertical motion of the latching projection. The tip end of the actuator forms a wedge that is received within the pocket formed in the transceiver body when the transceiver is inserted into and engaged with the cage. The side of the pocket is a slant surface, on which the wedge slides to lift up the latching tab of the cage when the transceiver is pulled out from the cage by handling the bail. Thus, the engagement between the latching projection of the transceiver and the latching tab of the cage may be released. The actuator provides a spring which sets the neutral position of the actuator as the wedge being received within the pocket.

Recently, a new system, often called as an optical hub-system has been proposed, where a plurality of pluggable transceivers is densely arranged in both vertically and horizontally. For instance, arranging transceivers in a configuration of 24 pieces in horizontally by 2 arrays in vertical may constitute the hub system with 48 channels. In such system, when transceivers around the target one receive the optical connector, it is often encountered that the bail of the target transceiver is hard to extract the target transceiver from the cage by picking the bail or to rotate the bail because of the existence of the optical cables and the optical connectors set in the peripheral transceivers.

SUMMARY OF THE INVENTION

The present invention is to provide a pluggable optical transceiver with an innovative mechanism, by which the transceiver may be easily extracted from the cage even when a plurality of cages is arranged in dense and each cage receives the transceiver with an optical connector with a cable.

The transceiver of the present invention comprises an optical receptacle, an actuator, a bail and a release button. The actuator, the bail and there lease button are assembled with the receptacle. The actuator includes hooking, supporting and body portions, where the hooking portion and the body portion perform a seesaw motion by the supporting portion as a center of the motion. The hooking portion provides, in a tip thereof, a hook to be engaged with the keyhole of the cage and the body portion provides a first arched surface.

The bail includes a pair of legs and a bridge connecting the legs. The leg provides an axial hole and a cam projection. The cam projection, connected with the rotation of the bail with the axial hole as the center, slides on the first arched surface to induce the seesaw motion of the actuator.

The release button, when it is pushed, slips under the body portion of the actuator to lift the actuator, accordingly, to bring the seesaw motion and, at the same time, the button pushes the cam projection to induce the rotation of the bail.

BRIEF DESCRIPTION OF DRAWINGS

FIGS. 6A and 6B are side and plan views showing a positional relation between the release button and the actuator at the initial position, respectively, and FIGS. 6C and 6D are side and plan views showing a positional relation between the release button and the actuator when the button is pushed; and FIGS. from 7A to 7E show a motional relation between the release button, the bail and the actuator.

DESCRIPTION OF PREFERRED EMBODIMENTS

Figure 1:
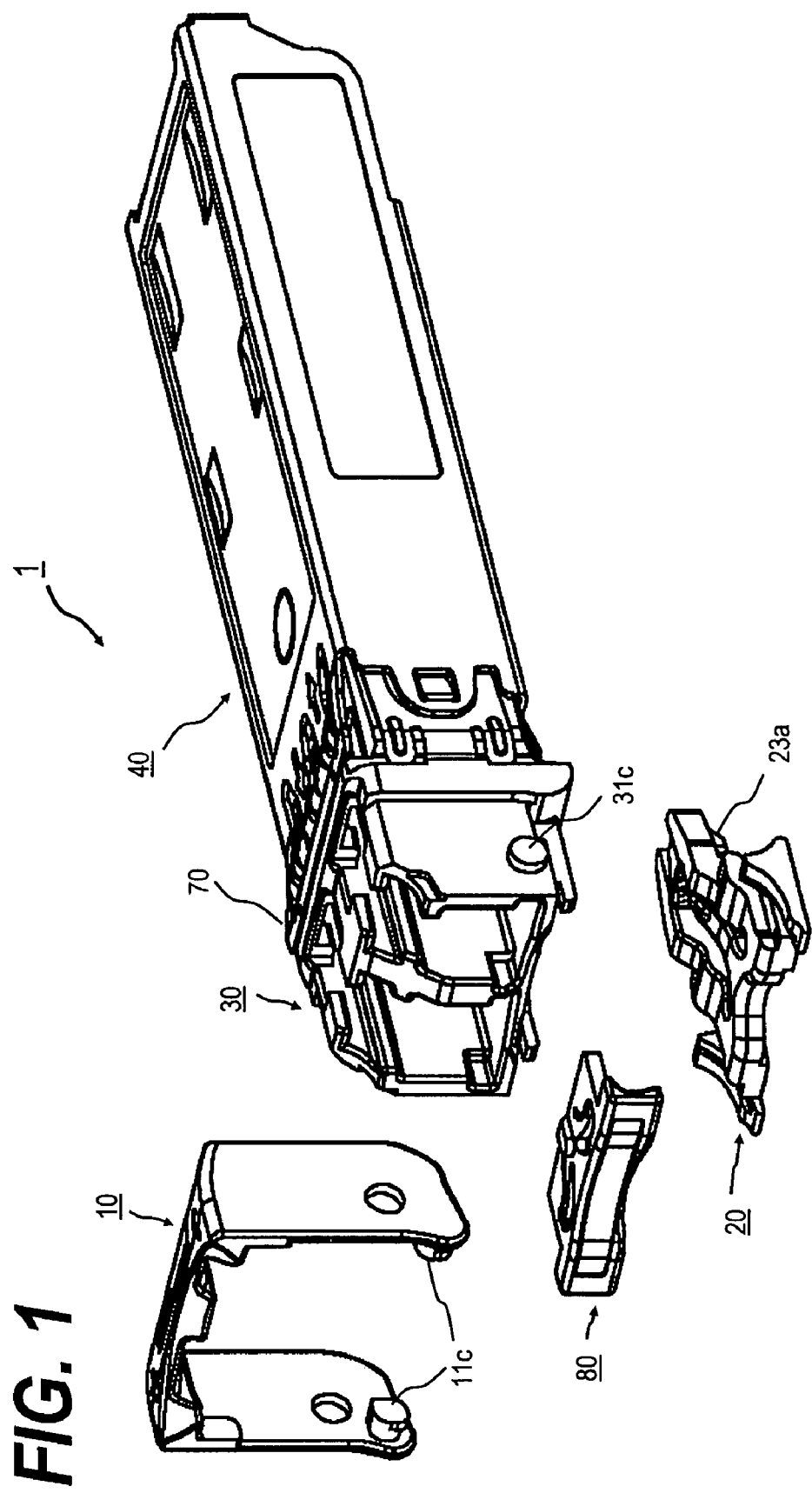
FIG. 1 is a exploded view of a pluggable optical transceiver according an embodiment of the present invention.

FIG. 1 is a perspective view of a pluggable optical transceiver (hereinafter called as a transceiver) according to an embodiment of the present invention. The transceiver 1 includes a bail 10, an actuator 20, an optical receptacle 30, a cover 40, a ground tab 70 and a release button 80. Here, the front side of the transceiver 1 is a side where the optical receptacle is installed, while the rear side is a side opposite thereto. Moreover, a side that is not illustrated in FIG. 1, that is, the optical receptacle 30 provides the actuator therein, is regarded as the lower side, while the other side, which is illustrated as an open side, is regarded as the upper side. The upper and lower sides above defined reflect the practical direction when the transceiver 1 is inserted in the cage.

The cage, which is installed on the host board, receivers the rear side of the transceiver 1 such that an electrical plug, which is hidden in FIG. 1, provided in the rear end of the transceiver 1 mates with an electrical connector mounted in the deep end of the cage. Thus, an electronic system on the host system may communicate with the electronic circuit within the transceiver 1. The face panel of the host system forms an opening to expose the front of the optical receptacle, thus, an optical connector with an optical fiber may mate with the optical receptacle 30 through the opening of the face panel.

The optical receptacle 30 mounts the bail 10, the actuator 20 and the release button 80 in the bottom thereof. The actuator 20 has a hook 23a that engages with a keyhole formed in the bottom of the cage. The bail 10 is attached to the optical receptacle 30 so as to pivot in front of the receptacle 30, which induces a motion of the cam projection 11b of the bail 10 to push down the front side of the actuator 20 to induce a seesaw motion of the actuator 20, accordingly, to draw the hook 23a to the body of the transceiver to release the engagement between the hook 23a and the keyhole of the cage.

In a situation, when a plurality of transceivers each having an arrangement shown in FIG. 1 is densely arranged crosswise and lengthwise, such as in the optical hub system, each cage arranged in peripheral of the target transceiver receives the transceiver besides the transceivers around the target transceiver install respective optical connectors, it is often encountered that, because of the existence of the peripheral transceivers and the optical connectors mated therewith, to pivot the bail nor to pick the bail after pivoting to extract the transceiver 1 from the cage becomes hard. In the present invention, even such situation that it becomes quite difficult to pick the bail, the transceiver 1 provides the release button 80 as well as the bail 10 to release the engagement with the cage. To push the button 80 induces the downward motion of the front side of the actuator 20, which causes the seesaw motion of the actuator 20 to release the engagement of the hook 23a with the keyhole of the cage.

The hook 23a of the actuator 20 and the ground tab 70 extrude from the front end of the cover 40, namely, a gap between the body of the optical receptacle 30 and the cover 40. As already explained, the transceiver 1 is set within the cage by engaging the hook 23a with the keyhole of the cage. For the ground finger 40, it comes in contact with the cage when the transceiver 1 is properly set within the cage, which not only makes the ground of the transceiver 1 stable but also secures a heat dissipating path from the transceiver 1 to the cage 2.

The actuator 20, the optical receptacle 30, the release button 80 and the bail 10 of the present embodiment are made of mold resin. The bail 10 may be made of metal. Further, the cover 40 is formed by the cutting, the bending and the tapping. Neither the welding nor an adhesive is used. Next, detailed arrangement of the bail 10, the actuator 20, the release button 80 and the optical receptacle 30 will be described as referring to accompanying drawings.

a. Actuator

Figure 2A:
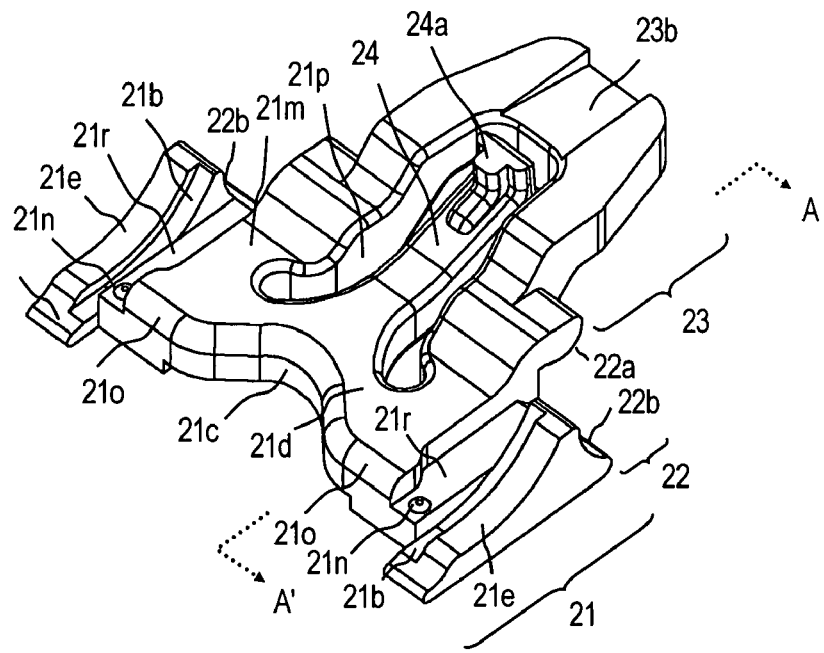
FIGS. 2A and 2B are perspective views of an actuator according an embodiment of the present invention.
Figure 2B:
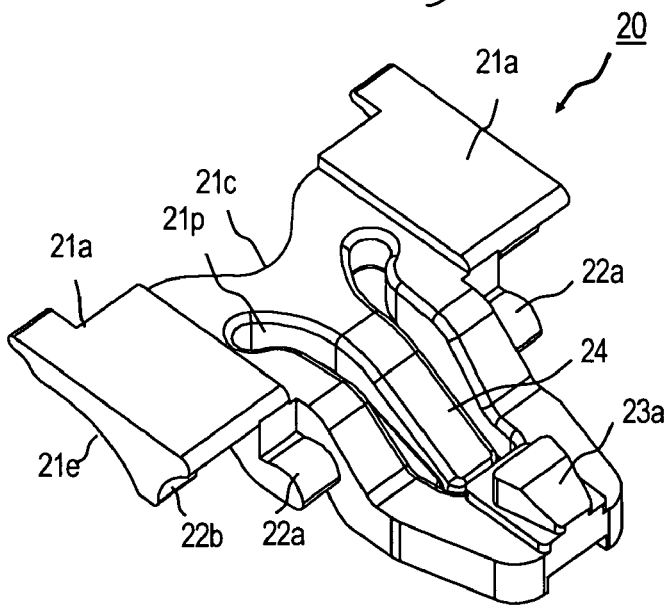
Figure 2C:
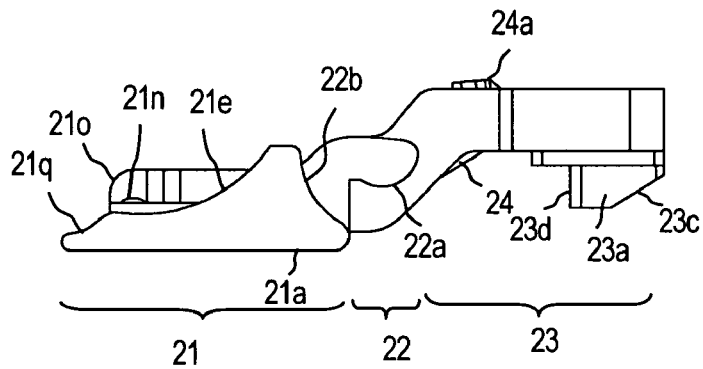
FIG. 2C is a side view of the actuator.

FIG. 2A is a perspective view of the actuator 20 according to an embodiment of the invention, FIG. 2B is that viewed from the bottom side, and FIG. 2C is a side view of the actuator 20. The actuator 20 roughly comprises a body portion 21, a support portion 22, a hooking portion 23 and an elastic portion 24. The body portion 21 includes a pair of side portions 21a in both sides thereof and a bridge 21d to connect the side portions 21a. The elastic portion 24 is surrounded by a U-shaped cutting 21p and extends rearward from the bridge 21d. The actuator 20 of the present embodiment is made of resin integrally molding those portions.

The side portion 21a forms several surfaces each coming in contact with the cam projection 11b of the bail 10. That is, the side portion 21a includes, in the upper surface thereof, a guide groove 21b and a guard 21e swelled from the guide grove 21b. The side portion 21a also forms another curved surface 21q continuous to the guard 21e and the guide groove 21b. Between the curved surface 21q and the guard 21e is formed with a small bump. The bail 10 may show the snap action when the cam projection 11b of the bail 10 climbs over the bump between the surface 21q and the guard 21e.

The guide groove 21b receives the guard 11c of the cam projection 11b, while the guard 21e is received in the hollow 11d of the cam projection 11b. Moreover, the actuator 20 provides in a rearward portion of the side 21a a curved surface 22b that faces the projected surface 31d formed in the bottom of the optical receptacle 30. As described later in the specification, this curved surface 22b faces the surface 31d, and at the same time, the flange 22a with a curved surface fits in the pocket 31o, by which the optical receptacle 30 builds the actuator 20. That is, the optical receptacle 30 installs the actuator 20 by putting the surfaces, 22a and 22b, between the surface 31d and the pocket 31o.

The upper end of the front portion of the bridge 21d is chamfered so as to form a sloped surface 21o. When the release button is pushed, the slope 82b of the button 80 lifts this sloped surface 21o to cause the seesaw motion of the actuator 20, which pulls the hook 23a in the body of the transceiver 1 and releases the engagement with the cage.

The elastic portion 24 is formed so as to make an slight angle with respect to the primary surface 21m of the body portion. That is, the elastic portion 24 is bent to the primary surface 21m by about 3.5° such that the tip portion where the projection 24a is formed is lifted from the primary surface 21m. The actuator 20 is set in the optical receptacle 30 as the elastic portion 24 is pressed. The repulsive force caused by the original bent is absorbed by the pocket 31o of the optical receptacle 30; however, because the flange 22a for the seesaw motion is offset from the root of the elastic portion 24, the repulsive force lifts the front side 21c of the actuator 20 upward, that is, the front side 21c of the actuator 20 is automatically pressed against the bottom of the optical receptacle 30. Thus, the projection 21n formed within the side groove 21r abuts against the rail 31j of the optical receptacle 30, where the side groove 21r receives the rail 31j.

The tip of the elastic portion 24, which extends from the bridge 21d and strides over the support portion 22, reaches the hooking portion 23. The end of the elastic portion 24 forms a projection 24a that has a T-shaped cross section. This projection 24a restricts the forward-and-rearward motion of the actuator by setting the projection 24a into the pocket 31f provided in the center partition of the optical receptacle 30. Moreover, when the actuator 20 in the body portion 21 and the lathing portion 23 thereof performs the seesaw motion, the mating of the projection 24a with the pocket 31f generates a repulsive force against this seesaw motion. Therefore, even the seesaw motion is induced in the actuator 20 to release the mating of the hook 23a with the keyhole of the cage; the actuator 20 automatically recovers its original position, where the projection 23a mostly protrudes, due to the repulsive force caused by the elastic portion 24 by the operation to release the bail 10.

The supporting portion 22 provides the flange 22a with substantially cylindrical surface. Because the inner wall of the pocket 31o also has a cylindrical shape, setting this flange 22a into the pocket 31o of the optical receptacle 30, the seesaw motion of the actuator 20 with the flange 22a and the pocket 31o as the axis may be performed.

The tip of the hooking portion 23 forms the hook 23a. This hook 23a provides a slant surface 23c in the rear side of the transceiver, while, the foreside of the hook 23a provides a steep surface 23d. The transceiver 1, when it is inserted into the cage, the slant surface 23a pushes out the latch tab, where the key hole is formed, to smoothly enter the body of the transceiver 1 into the cage. On the other hand, once inserted transceiver 1 into the cage is hard, at least without a releasing mechanism of the present invention, to extract by hooking the steep surface with the keyhole of the face. The upper surface of the hooking portion 23 provides a wide groove 23b with a slant surface. This groove 23b receives the center partition 32d of the optical receptacle 30 therein when the actuator 20 performs the seesaw motion to pull the hooking portion 23 to the body of the transceiver 1, which enlarges the swing room of the seesaw motion.

FIG. 2C is a side view of the actuator 20, which clearly illustrates that the side portion 21a provides the curved surface 21q with the first curvature in the foreside and the other curved surface 21e of the guide wall with a second curvature in the rear side. As described later, to slide the cam projection 11b of the bail 10 on the first and second curved surfaces, 21q and 21e, may induce the seesaw motion of the actuator 20. Moreover, the side portion 21a further provides the third curved surface 22b that faces the cylindrical surface 31d of the optical receptacle 30 to make the seesaw motion of the actuator 20 smooth.

b. Optical Receptacle

Figure 3A:
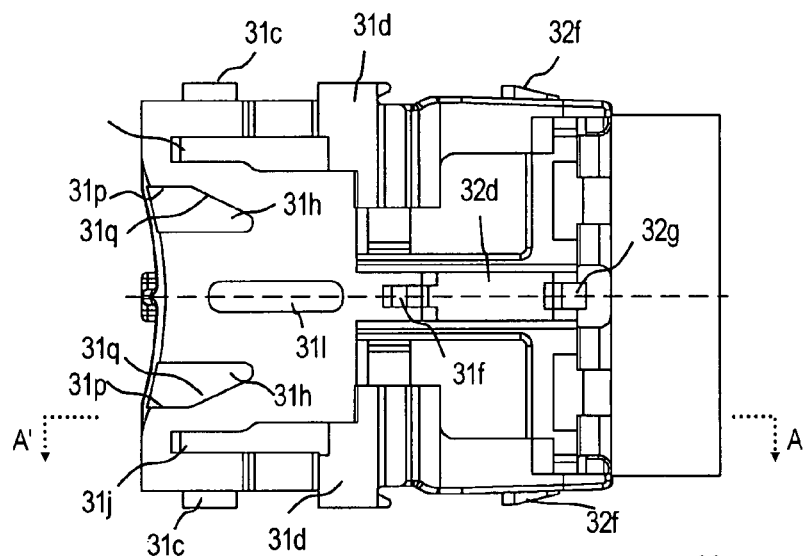
FIG. 3A is a bottom view of an optical receptacle of an embodiment of the invention.
Figure 3B:
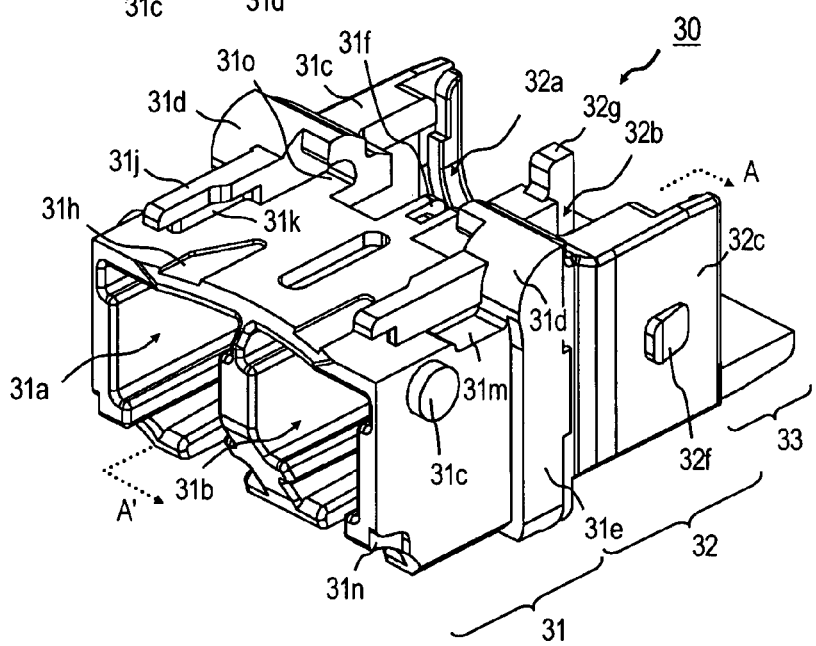
FIG. 3B and FIG. 3C are bottom and top perspective views of the optical receptacle, respectively.
Figure 3C:
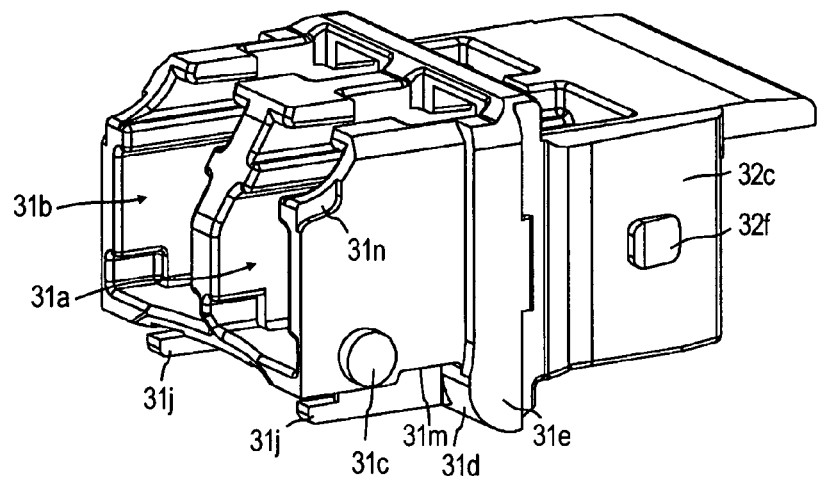

FIG. 3A is a bottom view of the optical receptacle according to an embodiment of the invention, FIG. 3B is a perspective appearance of the optical receptacle viewed from the bottom, while, FIG. 3C is a perspective appearance thereof viewed from the top. A surface explicitly appeared in FIGS. 3A and 3B corresponds to the bottom of the optical receptacle 30. The optical receptacle 30 shown in the figures, which is made of resin molding, includes a receptacle portion 31, an OSA mounting portion 32 and a coupling portion 33. The receptacle portion 31 forms a pair of apertures, 31a and 31b, for the transmitter and the receiver, respectively, which mate with the optical connector. Inner dimensions, width and depth, and the interval between the apertures are strictly determined by the standard of the optical connector.

The sides of the receptacle portion 31 forms an axial projection 31c that becomes an axis of the rotation of the bail 10.

The bottom of the receptacle portion 31 forms the pocket 31o, which becomes the axis of the seesaw motion by the actuator 20 by receiving the flange 22a of the actuator 20. The pocket 31o has a semi-cylindrical inner shape that traces the cylindrical outer shape of the flange 22a. In the rear end of the receptacle portion 31 forms a step 31e, against which the rear edge 11e of the bail 10 abuts to show a snap action of the bail. This step 31e also has a stopper function for the rotation of the bail 10.

The side of the receptacle portion 31 also provides two hollows, 31m and 31n. The former hollow 31m shows a stopper function for the rotation of the bail by abutting against the cam projection 11b, while, the latter hollow 31n, which fits with the step 11g formed in an inner side of the leg portion 11 of the bail 10, determines an initial position of the bail 10. That is, the hollow 31n is formed in a substantially rectangle. On the other hand, the inner surface of the leg portion 11 of the bail 10 provides a substantially rectangular step 11g. When the bail 10 is in the initial position, namely, the bridge 12 is in the upside of the apertures, 31a and 31b, the step 11g in the bail 10 fits with the hollow 31n of the receptacle 31, which suppresses the backlash of the bail and realizes the snap action.

The OSA mounting portion 32 forms two spaces, 32a and 32b, within which the TOSA (transmitter optical sub-assembly) and the ROSA (receiver optical sub-assembly) are installed. Two side walls 32c and the center partitions 32d forms these two spaces, 32a and 32b, and various structures such as curved surfaces and projections are formed in the spaces to set the OSAs. The center partition 32d forms the pocket in the front end thereof, which receives the projection 24a with the T-shape section formed in the rear end of the elastic member 24 of the actuator. Further, the thickness of this center partition 32d is set to a value such that the wide groove 23b of the hooking portion 23 of the actuator 20 receives the wall 32d. The outer side 32c of the mounting portion 32 forms a projection 32f that engages with the tab plate in the cover 40.

The coupling portion 33 assembles the ground finger 70 with the optical receptacle 30. The ground finger 70, as shown in FIG. 1, extrudes from a gap between the optical receptacle 30 and the cover 40 even after the assembly of the cover 40 with the optical receptacle 30, which enables for the finger 70 to come in directly contact with the wall of the cage when the transceiver 1 is set within the cage, thus, a ground of the transceiver 1 is reinforced. Although the present optical receptacle 30 is made of resin, the ground finger 70 directly coming in contact with the cage reinforces, as well as the ground potential, the EMI shielding function.

The optical receptacle 30 according to the present embodiment provides mechanisms, namely, structures in the bottom thereof to assemble the release button 80. The mechanisms are a center pocket 31l, a pair of sliding groove 31h and a pair of rails 31j. The mechanism to build the button 80 with the optical receptacle 30 and the operation or the function of the button to the actuator 20 will be later.

Moreover, the bottom of the receptacle portion 31 provides the cylindrical surface 31d that comes in contact with the surface 22b to make the seesaw motion of the actuator 20 smooth. Inner side of the cylindrical surface 31d forms the pocket 31o that receives the flange 22a of the actuator 20.

c. Bail

Figure 4A:
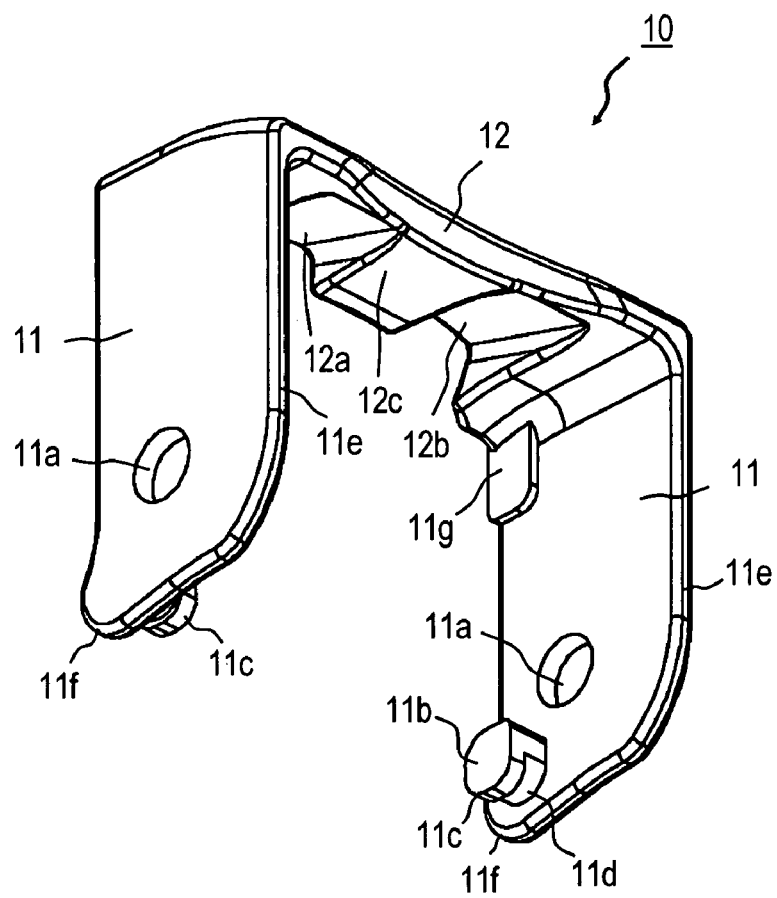
FIG. 4A is a bottom perspective view of a bail according to an embodiment of the invention.
Figure 4B:
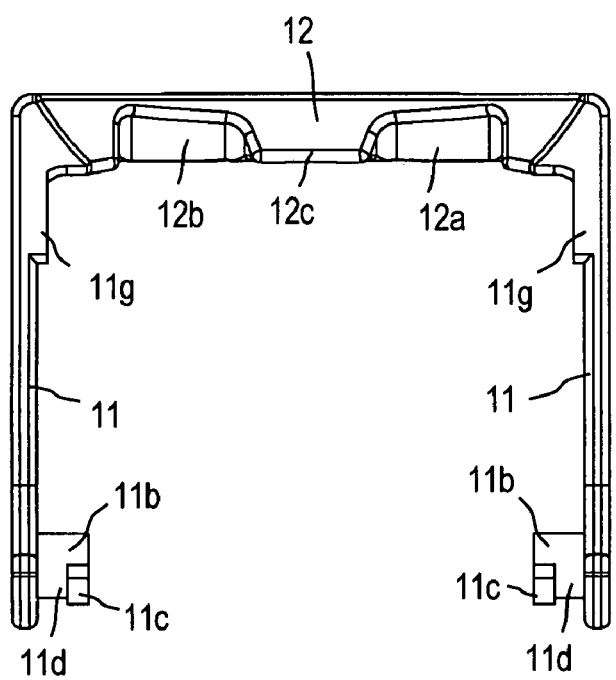
FIG. 4B is a front view of the bail.

FIG. 4A is a perspective drawing of the bail 10 according to an embodiment of the present invention, which is viewed from the bottom side, and FIG. 4B is a front view of the bail 10. The bail 10 comprises a pair of legs 11 and a bridge 12 connecting the legs 11, which forms a U-shaped cross section.

The bridge 12 forms two hollows, 12a and 12b, in an inner surface thereof. These hollows, 12a and 12b, corresponds to respective apertures, 31a and 31b, in the optical receptacle 30, and form the pair of combined apertures therewith when the bail 10 is in the initial position.

Each leg 11 provides an hole 11a in a center thereof through which the axial projection 31c of the optical receptacle 30. The bail 10 may rotate by the hole 11a and the axial projection 31c as a center of the rotation. The leg 11 has the cam projection 11b in a lower side of the hole 11a. This cam projection 11b slides on the surfaces, 21b, 21e and 21q, of the actuator 20 as rotating the bail 10 which induces the seesaw motion of the actuator to release the engagement of the hook 23a with the keyhole.

Describing in detail, the cam projection 11b has a composite shape with a guard 11c and the hollow 11d. The guard 11c is to be set within the guide groove 21b, while, the hollow 11d receives the guard 21e of the actuator 20. Moreover, this composite shape of the cam projection 11b prevents the bail from disengaging with the actuator 20 and the receptacle 30. That is, even when the bail 10 pivots in front of the receptacle 30, this composite structure of the cam projection 11b prevents the leg 11 from expanding outward, because the guard 11c abuts against the inner surface of the guard 21e.

The rear end 11g of the leg 11 has a linear shape that abuts against the step 31e of the receptacle 30 when the bail 10 is in the initial position, where the bridge 12 of the bail 10 is in the upside of the optical receptacle 30. The tip end 11f of the leg 11 abuts against the step 31e when the bail 10 is mostly pivoted which shows a function of the rotation stopper.

The bail 10 according to the present embodiment forms the step 11g with a substantially rectangular shape in the inside of the leg 10. This step 11g, the plane shape of which corresponds to the section of the hollow 31n formed in the side of the receptacle 30, may induce the snap action when the bail 10 rotates from the initial position. When the bail 10 is in the initial position, the step 11g fits with the hollow 31n. Pivoting the bail 10, the step 11g is released from the hollow 31n and the bail 10 is smoothly pivoted thereafter. Thus, the step 11g and the hollow 31n may induce the snap action of the bail 10.

d. Release Button

Figure 5A:
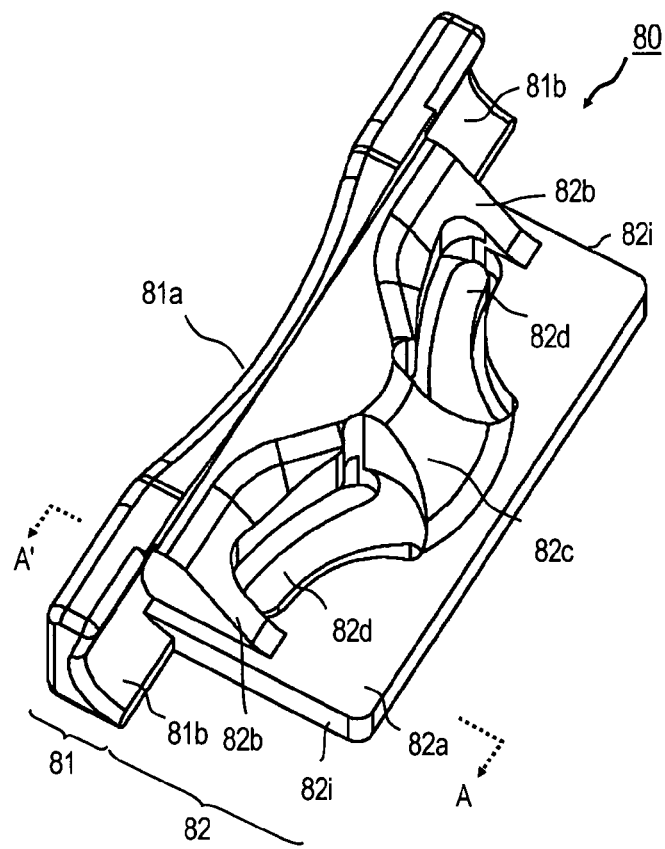
FIGS. 5A and 5B are bottom and top perspective views of a release button according to an embodiment of the invention.
Figure 5B:
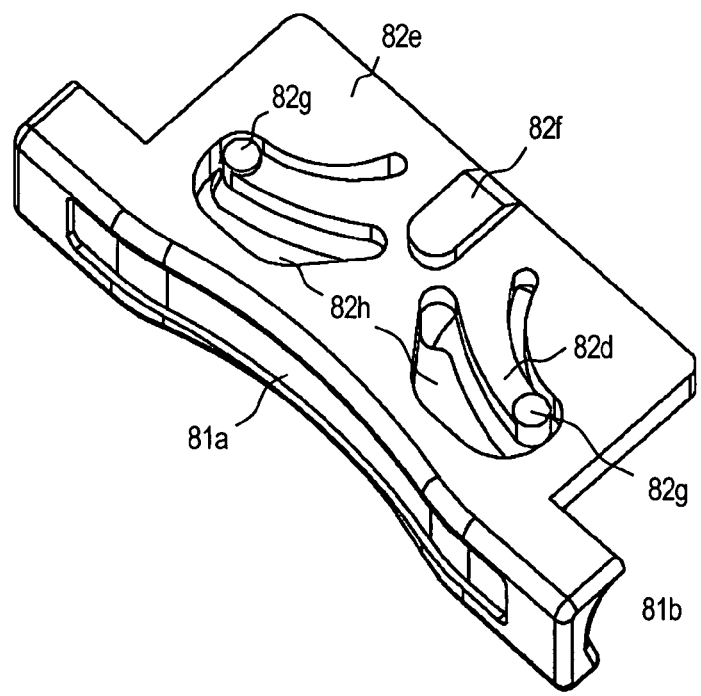

FIGS. 5A and 5B are perspective views of the release button 80 according to an embodiment of the invention. FIG. 5A is viewed from the bottom, while, FIG. 5B is viewed from the upside. The release button 80 includes a pressed portion 81 in a forward side and an acting portion 82 in a rear side thereof. The pressed portion 81 has a width substantially corresponding to the width of the bridge 12 of the bail 10, and provides a front with slightly drawn back to trace the front shape of the receptacle 30, while an arched surface 81b in the rear.

To pushing the button 80 may cause the seesaw motion of the actuator 20 to disengage the hook 23a with the keyhole. Pushing the button, the arched surface 81b in the rear of the pressed portion 81 comes in contact with the cam projection 11b to induce the rotation of the bail 10, that is, the release button 80 may induce not only the seesaw motion of the actuator 20 but also the rotation of the bail 10.

The acting portion 82 includes a primary surface 82a with a width substantially equal to a width between walls 31k beneath the rails 31j of the receptacle 30 and a plurality of slopes, 82b and 82c, on the primary surface 82a and continuous from the pressed portion 81. The center slope 82c extends from side slopes 82b, which follows the front shape 20c of the actuator 20. Pushing the release button 80, the slopes 82b in both sides of the button 80 come in contact with and run on the chamfered edge 21o in the front end of the actuator 20, which presses down the front side of the actuator 20 to induce the seesaw motion. Both edges 82i of the primary surface 82a are fit within the rails 31j of the receptacle, thus, the release button 80 does not operate in up and down direction.

On the other hand, as shown in FIG. 5B, the top surface 82e forms a center projection 82f that is set within the center pocket 31l of the receptacle 30, and a pair of elastic bars 82d protruding from a center within an opening 82h. The end portion of the elastic bar 82d forms a projection 82g. This elastic bar 82d bends horizontally, connected with the pushing of the release button, as the projection 82g traces the edge of the sliding groove 31h in the receptacle 30, which causes a repulsive force to the button 80. Therefore, releasing the button 80, the button automatically recovers its initial position where the front edge of the center projection 82f abuts against the front side wall of the sliding groove 31h.

Next will describe operations of each member in detail.

e. Release Button and Seesaw Motion of Actuator

FIGS. 6A to 6D show mechanism of the seesaw motion of the actuator 20 induced by the pushing of the release button 80. FIGS. 6A and 6B show cross section when the button 80 is in the initial position, while, FIGS. 6C and 6D show a state when the button 80 is pushed. The plane cross section shown in FIGS. 6B and 6C are taken along the ling A-A' shown in FIGS. 2A, 3B and 5A.

When the release button 80 is in the initial position, which is shown in FIGS. 6A and 6B, the chamfered slope 21o of the front end of the actuator 20 does not run on the slopes 82b. In this position, the elastic bar 82d is not bent such that the tip projection 82g comes in contact with the first side 31p of the sliding groove 31h. The first side 31p is in parallel to the longitudinal axis X of the transceiver 1, and the interval between the first sides 31p in respective grooves 31h is equivalent to the distance between the tips of the elastic bar 82d.

Pushing the release button 80, the front chamfered slope 21o runs on the slopes 82b, of the button 80, which presses down the front side of the actuator 20 to induce the seesaw motion thereof around the axis 22a. The actuator 20 makes the seesaw motion as the arched surface 22b follows the cylindrical surface 31d of the receptacle.

Concurrently, the elastic bar 82d within the button 80 is bent as the tip projection 82g thereof abuts against the second side wall 31q of the sliding groove 31h. Because the gap between the second side walls 31q of each sliding groove 31h, exactly speaking, the gap gradually narrows as the button 80 advances; the button 80 always senses a repulsive force. That is, one releasing the button 80 automatically recovers its initial position, where the center projection 82f is in the front end of the center pocket 31l in the receptacle 30. For the actuator 20, because the bent assembling of the elastic portion 24 also causes the recovery force, the actuator 20 automatically recovers its original position in the same time of the recovery of the release button 80.

The release button 80 is unable to be detached from the optical receptacle 30 because the side 82i thereof slides within and is secured in the rail 31j.

f. Release Button, Rotation of Bail, and Seesaw Motion of Actuator

FIGS. from 7A to 7E show mechanism of the release button 80, the rotation of the bail 10, and the seesaw motion of the actuator 20. In the initial position, which corresponds to FIG. 7A, the bail 10 in the bridge thereof positions in the top of the optical receptacle to expose two apertures, 31a and 31b. Two hollows, 12a and 12b, in the inside of the bridge 12 fit with the apertures, 31a and 31b, to facilitate the insertion of the optical connecter into these apertures, 31a and 31b. The step 11g in the inner of the leg 11 is fitted within the hollow 31n in the side of the optical receptacle 30.

Pushing the release button 80, the arched surface 81b of the button 80 abuts against the cam projection 11b of the leg to push the cam projection 11b rearward, which brings the angular moment in the leg 11 around the axial projection 31c of the receptacle 30. Thus, the bail 10 begins to rotate from the initial position to a direction to hide the apertures, 31a and 31b, by the bridge 12, shown in FIG. 7B. Concurrently, the cam projection 11b begins to slide on the first arched surface 21q of the actuator 20.

Figure 7A:
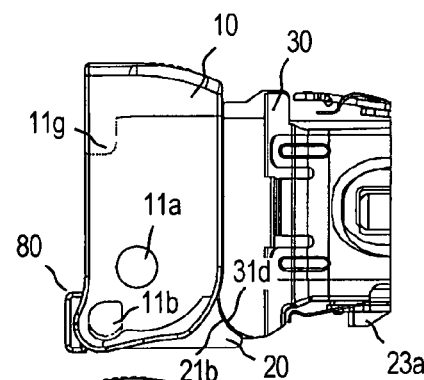
Figure 7B:
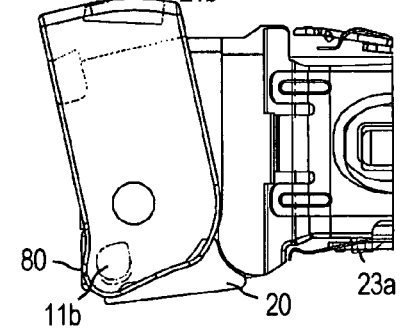
Figure 7C:
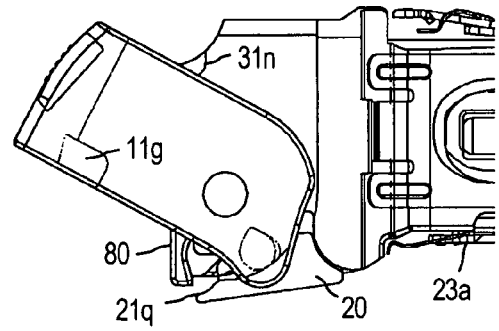

Further pushing the release button 80, which is shown in FIG. 7C, the cam projection 11b gets over a bump at an interface between the first and second arched surfaces, 21q and 21e, concurrently, the step 11g in the inside of the leg 11 is slip out from the hollow 31n in the receptacle 30, which reflects the snap action of the bail's rotation. This condition may continue after the releasing of the button 80, accordingly, the bridge 12 of the bail 10 may be easily picked up in front of the apertures, 31a and 31b, of the receptacle.

Figure 7D:
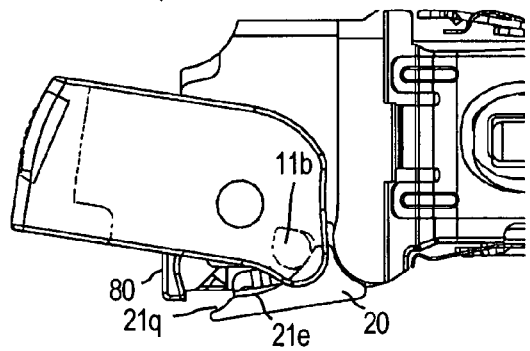
Figure 7E:
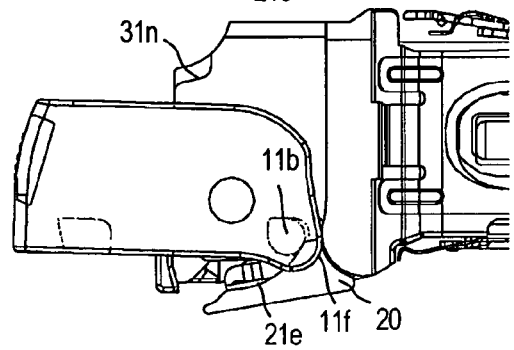

Although the release button 80 is unable to push further, the bail 10 freely rotates by the axial projection 31c as the axis and the cam projection 11b thereof smoothly slides on the second arched surface 21e because the step 11g in the leg 11 slips out from the hollow 31n. Rotating the bail 10 continuously induces the seesaw motion of the actuator 20, as shown in FIG. 7D. Rotating the bail 10 until the bridge 12 comes in front of the apertures, 31a and 31b, the manipulation to pick the bridge 12 becomes easy to extract the transceiver 1 from the cage.

The rotation of the bail 10 stops when the cam projection 11b comes in contact with the surface 31m of the receptacle 30. This position of the bail 10 corresponds to a condition where the tip 11f of the leg 11 comes in contact with the step 31e of the receptacle 30.

The description above concentrates on a case when the pushing of the release button 80 brings the rotation of the bail 10. However, the rotation of the bail 10 may be independent of the pushing of the release button 80. That is, pulling the bail 10 in the bridge thereof frontward from the initial position, which is shown in FIG. 7A, the bail 10 may be rotated as the cam projection 11b slides on the first arched surface 11q. Synchronizing the rotation of the bail 10, the actuator begins the seesaw motion to bring the hook 23a toward the body of the transceiver 1 and to release the engagement between the hook and the keyhole (FIG. 7C). The action of the bail 10 and that of the actuator 20 so far are independent of the position and the condition of the release button 80. Continuing the rotation of the bail 10, the manipulation of the bridge may become easy as described above.

What is claimed is:

1. A pluggable optical transceiver inserted into and extracted from a cage mounted on a host system, the cage providing a keyhole, the transceiver comprising:
    an optical receptacle configured to receive an optical connector;
    an actuator assembled with the optical receptacle, the actuator providing a hooking portion with a hook, a supporting portion and a body portion with a first arched surface, the hooking portion and the body portion performing a seesaw motion by the supporting portion as a center to engage and disengage the hook with keyhole of the cage;
    a bail assembled with the optical receptacle, the bail including a pair of legs and a bridge connecting the legs, the leg providing an axial hole and a cam projection, the cam projection, connected with a rotation of the bail with the axial hole as a center, sliding on the first arched surface of the actuator to induce the seesaw motion of the actuator; and
    a release button attached to the optical receptacle to be configured, when the button is pushed, to slip under the body portion of the actuator to bring the seesaw motion of the actuator and to push the cam projection to induce the rotation of the bail.

2. The optical transceiver according to claim 1, wherein the release button includes a pressed portion and acting portion, the pressed portion providing a surface to abut against the cam projection of the ball, the acting portion includes a slope to slip under the body portion of the actuator.

3. The optical transceiver according to claim 2,
    wherein the acting portion of the release button further includes a pair of elastic bars and a pair of openings, the elastic bar providing a projection in a tip thereof and extruding into the opening, and
    wherein optical receptacle provides a pair of rails and a sliding groove, the rail receiving a side of the acting portion and the sliding groove receiving the tip projection of the elastic member, each sliding groove providing first and second side walls coming in contact with the tip projection of the elastic member, an interval between the first side walls being constant and an interval between the second side walls gradually decreasing to a direction to which the release button is pushed such that the release button automatically recovers an initial position where the tip projection of the elastic bar comes in contact with the first side wall by an repulsive force cased by the bending of the elastic bar when the tip projection comes in contact with the second side wall of the sliding groove by pushing the release button.

4. The optical transceiver according to claim 3,
    wherein the acting portion of the release button further provides a center projection and the optical receptacle further provides a center pocket to receive the center projection of the release button, and
    wherein the center projection is set in an edge of the center pocket when the release button is set in the initial position.

5. The optical transceiver according to claim 1,
    wherein the body portion of the actuator further provides a second arched surface continuous with the first arched surface, a curvature of the first arched surface being different from a curvature of the second arced surface to form a bump therebetween, and
    wherein the cam projection of the bail slides on the first and second arched surfaces of the actuator as making a snap action when the cam projection climbs over the bump.

6. The optical transceiver according to claim 1,
    wherein the leg of the bail provides a step and the optical receptacle provides a hollow whose section corresponds to a section of the step of the bail, and
    wherein the step is fitted within the hollow when the bail is in the initial position.

7. The optical transceiver according to claim 6,
    wherein the actuator further provides a third arched surface and the optical receptacle provides a cylindrical surface that comes in contact with the third arched surface so as to make the seesaw motion of the actuator smooth.

8. The optical transceiver according to claim 1,
wherein the actuator further provides an elastic portion extending from the body portion to the hooking portion, the elastic portion making an angle with respect to a primary surface of the body portion.

9. The optical transceiver according to claim 8,
wherein the angle between the elastic portion and the primary surface of the actuator generating a repulsive force such that the actuator automatically recovers an initial position when the actuator is assembled with the optical receptacle.

10. The optical transceiver according to claim 1,
wherein the cam projection of the bail includes a guard and a hollow, and the actuator includes a guard and a guide groove, the hollow of the bail receiving the guard of the actuator and the guide groove of the actuator receiving the guard of the bail.

* * * * *